United States Patent
Mitsui et al.

[15] 3,675,002
[45] July 4, 1972

[54] SYSTEM FOR COMPUTING ELECTRIC POWER FLOW

[72] Inventors: Tsuneo Mitsui, Tokyo; Jun-Ichi Baba, Kobe; Ikuo Yamada, Kobe, all of Japan

[73] Assignees: Tokyo Denryoku Kabushiki Kaisha; Mitsubishi Denki Kabushiki Kaisha, Tokyo, Japan

[22] Filed: June 23, 1970

[21] Appl. No.: 49,122

[52] U.S. Cl. ......................... 235/185, 235/151.21, 235/184
[51] Int. Cl. .......................................................... G06g 7/50
[58] Field of Search .......................... 235/184, 185, 151.21; 324/57 FP

[56] References Cited

UNITED STATES PATENTS

| | | | |
|---|---|---|---|
| 2,323,588 | 7/1943 | Enns | 235/185 |
| 2,491,095 | 12/1949 | Enns | 235/185 |
| 2,301,470 | 11/1942 | Starr | 235/185 |

*Primary Examiner*—Felix D. Gruber
*Attorney*—Robert E. Burns and Emmanuel J. Lobato

[57] ABSTRACT

Disclosed herein is a simulated power system including a network of resistances, power sources, and loads corresponding respectively to line reactances, generators, and loads of an actual power system, and further including measuring devices for determining voltages and current flow between selected nodes (e.g. $m$ and $n$) of the network, wherein the active power $Pmn$ and the reactive power $Qmn$ through the branch between the nodes can be calculated rapidly according to the formulas $$Pmn = \frac{\theta m - \theta n}{Xmn},$$

and $$Qmn = \frac{\Delta Vm - \Delta Vn}{Xmn},$$

where $\theta m$ and $\theta n$ are the phase angles at the respective nodes and are proportional to the voltages at the nodes, and $\Delta Vm$ and $\Delta Vn$ are difference voltages between actual and standard voltages at the selected nodes. In the simulated system the power sources are provided by constant current supply devices or constant voltage devices, and the load units are provided by constant current withdrawal devices, wherein the power sources and loads are connected to predetermined nodes of the network.

4 Claims, 5 Drawing Figures

3,675,002

SYSTEM FOR COMPUTING ELECTRIC POWER FLOW

BACKGROUND OF THE INVENTION

This invention relates to a simulated electric power system for use in rapidly computing a power flow through an actual electric power system.

The power flow computing system of this invention can be employed to compute active, reactive powers and voltages, and phase angles of the electric power system, within a short interval of time during the normal operation thereof, and also during system disturbances resulting from predetermined suspension of the associated power equipments, or from occurrence of any failure etc. for the purpose of safely operating the electric power system in accordance with the result of the particular computation.

In the past, alternating current network analyzers have been used to compute power flow through an electric power system. Upon computing a power flow through a particular large-scaled, complicated electric power system, the conventional type of alternating current network analyzers have exhibited the following disadvantages:

1. Such network analyzers have been subject to a limitation as to the number of electric generators included in the electric power system so that they can not satisfactorily cover the electric power system. If it is attempted to satisfactorily cover the electric power system by the particular alternating current network analyzer then the latter is required to be greatly increased in its number of elements; and 2. The larger and more complicated the electric power system is the more difficult it will be to control the parameters involved. This makes it impossible to effect a stable computation.

Recently digital computers have been used to compute the power flow in large-scaled and complicated systems, and it has been required to change the large simulated system thereof, for example, upon system switching. Also upon changing the output from a particular generator it has been required to repeat the computation so as to cause the result of that computation to converge.

SUMMARY OF THE INVENTION

Accordingly, it is an object of the invention to provide a new and improved system for computing a power flow through an electric power system in a rapid and simple manner through the utilization of a simple network simulating the electric system.

The invention accomplishes this object by providing the simulated system in the form of a resistance network substantially simulating the electric power system, and including a plurality of simulated branch lines interconnected at the nodes thereof; generator units simulating each of the generators disposed in the electric power system and connected to each of selected ones of the nodes; and load units simulating each of the loads disposed in the electric power system and connected to each of selected ones of the nodes; means for measuring voltages at the nodes and currents flowing through the simulated branch lines; means for computing the actual active and reactive powers from the measured currents; and means for computing the actual voltages and phase angles thereof from the measured voltages.

Preferably, the simulated generator unit may comprise three potentiometers for setting the active and reactive powers and voltage respectively, and an operational amplifier selectively connectable to the potentiometers. For the active and reactive power simulation, the operational amplifier has a feedback resistor connected across the input and output thereof and includes means for taking the output from the unit through the feedback resistor to provide a source of constant current. For the voltage simulation the operational amplifier provides a source of constant voltage.

Similarly the simulated load unit may comprise a pair of potentiometers for setting the resistance and reactance of the actual load, an operational amplifier having a feedback resistor connected across the input and output thereof and selectively connectable to the potentiometers, and means for taking the output from the unit through the feedback resistor to provide a source of constant current.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENT

Figure 1:
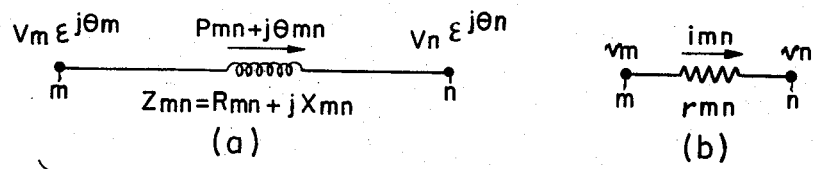
FIG. 1a is a schematic circuit diagram of one branch line of an electric power system to which the invention is applicable.
FIG. 1b is an equivalent resistance network useful in explaining the principles of the invention.

Since actual electric power systems are very complicated in configuration, the power flow characteristics thereof are also complicated. However such characteristics can be estimated from the power flow characteristic of a system branch such as shown in FIG. 1a or b of the drawings. Referring now to FIGS. 1a and b, a connection point or a node $m$ is connected to another node $n$ through an impedance $Z_{mn}$ (FIG. 1a) or an equivalent resistance $r_{mn}$ (FIG. 1b). It is now assumed that the voltages at nodes $m$ and $n$ are expressed, in vector form, as $V_m \epsilon^{j\theta_m}$ and $V_n \epsilon^{j\theta_n}$ respectively, and the impedance $$Z_{mn} = R_{mn} + j X_{mn} = Z_{mn} \, \epsilon j \left( \frac{\pi}{2} - \alpha_{mn} \right)$$

has flowing therethrough a power of $P_{mn} + j Q_{mn}$
where
$\epsilon$ = base of Napierian logarithm
$j$ = unit of imaginary number equal to $\sqrt{-1}$
$P_m$ = active power
$Q_m$ = reactive power, and
$\alpha_{mn}$ = arctan $(Rmn/Xmn)$ Under the assumed condition, the following equation is held:

$$P_{mn} + j Q_{mn} = V_m \cdot I_{mn}{}^* \quad (1)$$

where $I_{mn}{}^*$ = conjugate value of complex current, $I_{mn}$ flowing between the nodes $m$ and $n$. The variables $Vm$, $Vn$, $Zmn$, $Pm$, $Qm$, etc., are based on a per-unit system in all equations of this disclosure. In the above equation (1) a bagging reactive power is considered to be positive. Substituting $I^* = (V_m - V_n)^*/Z_{mn}{}^*$, where $(V_m - V_n)^*$ and $Z_{mn}{}^*$ are conjugate values of the complex values $(V_m - V_n)$ and $Z_{mn}$, into the equation (1) gives $$P_{mn} + j Q_{mn} = V_m (V_m - V_n)^*/Z_{mn}{}^* \quad (2)$$

By using the trigonometric functions, the equation becomes $$P_{mn} + jQ_{mn} = \frac{V_m V_n}{|Z_{mn}|} \cos \alpha_{mn} \sin (\theta_m - \theta_n)$$

$$- \frac{V_m V_n}{|Z_{mn}|} \sin \alpha_{mn} \left[ \frac{V_m}{V_n} - \cos (\theta_m - \theta_n) \right]$$

$$+ j \left[ \frac{V_m V_n}{|Z_{mn}|} \cos \alpha_{mn} \left\{ \frac{V_m}{V_n} - \cos (\theta_m - \theta_n) \right\} \right.$$

$$\left. - \frac{V_m V_n}{|Z_{mn}|} \sin \alpha_{mn} \sin (\theta_m - \theta_n) \right]$$

Thus the active and reactive powers $P_{mn}$ and $Q_{mn}$ respectively can be expressed by the following equation:

$$P_{mn} = \frac{V_m V_n}{|Z_{mn}|} \cos \alpha_{mn} \sin (\theta_m - \theta_n)$$

$$+ \frac{V_m V_n}{|Z_{mn}|} \sin \alpha_{mn} \left[ \frac{V_m}{V_n} - \cos (\theta_m - \theta_n) \right] \quad (3)$$

and $$Q_{mn} = \frac{V_m V_n}{|Z_{mn}|} \cos \alpha_{mn} \left[ \frac{V_m}{V_n} - \cos (\theta_m - \theta_n) \right]$$

$$- \frac{V_m V_n}{|Z_{mn}|} \sin \alpha_{mn} \sin (\theta_m - \theta_n) \quad (4)$$

For purposes of simplicity it is assumed that (1) the active power $P_{mn}$ is determined only by a phase difference between the voltage $V_m$ and $V_n$ at the nodes $m$ and $n$, and that (2) the reactive power $Q_{mn}$ is determined only by a difference in voltage between the nodes $m$ and $n$. Then we have $\sin(\theta_m - \theta_n) \cong \theta_m - \theta_n$ (because $\theta_m - \theta_n$ is small),
$\sin \alpha_{mn} \cong \tan \alpha_{mn} = R_{mn}/X_{mn}$ (because $\alpha_{mn} \cong 0$),
$\cos \alpha_{mn} \cong 1.0$,
and $1 - \cos(\theta_m - \theta_n) \cong \frac{1}{2}(\theta_m - \theta_n)^2$ Further it is assumed that the voltages $V_m$ and $V_n$ are slightly different from a reference voltage of 1 per unit and can be expressed by $1 + \Delta V_m$ and $1 + \Delta V_n$ respectively. Then the equations (3) and (4) reduce respectively to:

$$P_{mn} = \frac{1}{|Z_{mn}|} (\theta_m - \theta_n) + \frac{1}{|Z_{mn}|} \frac{R_{mn}}{X_{mn}} (\Delta V_m - \Delta V_n)$$

$$+ \frac{1}{2} \frac{1}{|Z_{mn}|} \frac{R_{mn}}{X_{mn}} (\theta_m - \theta_n)^2 \quad (5)$$

and $$Q_{mn} = \frac{1}{|Z_{mn}|} (\Delta V_m - \Delta V_n) - \frac{1}{|Z_{mn}|} \frac{R_{mn}}{X_{mn}} (\theta_m - \theta_n)$$

$$+ \frac{1}{2} \frac{1}{|Z_{mn}|} (\theta_m - \theta_n)^2 + \frac{\Delta V_m}{|Z_{mn}|} (\Delta V_m - \Delta V_n) \quad (6)$$

If the active power $P_{mn}$ is computed in accordance with the first term of the equation, (5) the same can be expressed by $$P_{mn} = (\theta_m - \theta_n)/X_{mn} \quad (7)$$

on the assumptions that the voltages $V_m$ and $V_n$ respectively at both nodes $m$ and $n$ are approximately equal to each other ($V_m \cong V_n$), the relationship $V_m \cong 1.0$ per unit is held, and that the resistance $R_{mn}$ is negligibly small. The third and the 4th term of equation (6) correspond to the reactive power consumed by the current flowing through the reactance of transmission lines.

The reactive power $Q_{mn}$ can be expressed by the quation $$Q_{mn} = (\Delta V_m - \Delta V_n)/X_{mn}, \quad (8)$$

because the resistance $R_{mn}$ is negligibly small, and the reactive power consumed by the current flowing through the reactances of transmission lines is compensated by the reactive power supplied by a charging current of a capacitance between transmission lines to ground. (It is generally referred to as surge impedance loading.)

But in case of a heavily loaded long distance transmission line, it is necessary to have a suitable compensation circuit in the simulated system of the invention in order to improve the accuracy. That is: (1) the active power $P_{mn}$ is approximately determined only by the phase difference between the voltage $V_m$ and $V_n$ at the nodes $m$ and $n$; and, (2) the reactive power $Q_{mn}$ is determined only by the voltage difference between the nodes $m$ and $n$.

On the other hand, a current $i_{mn}$ flowing from the node $m$ to the node $n$ as shown in FIG. 1$b$ follows Ohm's Law and is given by the equation $$i_{mn} = (v_m - v_n)/r_{mn} \quad (9)$$

where
$v_m$ = voltage at the node $m$
$v_n$ = voltage at the node $n$
$r_{mn}$ = equivalent resistance simulating the actual line reactance between the nodes $m$ and $n$.

By comparing the equations (7) and (9) it will be appreciated that between the impedance network of FIG. 1($a$) and the equivalent resistance network of FIG. 1$b$, a correspondence is present between the active power $P_{mn}$ to the current $i_{mn}$ in the equivalent resistance network, and the phase angle of the voltage $\theta_m$ or $\theta_n$ to the voltage $v_m$ or $v_n$ in the equivalent resistance network. Then, by comparing equations (8) and (9), a correspondence is seen between the relative deviation $\Delta v_m$ or $\Delta V_n$ of the voltage from the reference to the voltage $v_m$ or $V_n$ for the resistance network, and the reactance $X_{mn}$ to the resistance $r_{mn}$ of the resistance network. It is noted that said calculation for the equivalent resistance network may be accomplished with respect to either alternating or direct current.

As a result, the power flow through the branch line of the electric power system such as shown in FIG. 1($a$) can be computed on the basis of the parameters of the resistance network as shown in FIG. 1($b$) by taking into account the correspondence of the parameters just described. In this regard, it is to be noted that all the parameters $P_{mn}$, $Q_{mn}$, $\theta_m$, $\theta_n$, $\Delta V_m$ and $\Delta V_n$ can not be simultaneously computed, but that the power $P_{mn}$ and the phase angles $\theta_m$ and $\theta_n$ can be simultaneously computed while the power $Q_{mn}$ and the voltage deviations $\Delta V_m$ and $\Delta V_n$ can be simultaneously computed using a resistance network.

Figure 2:
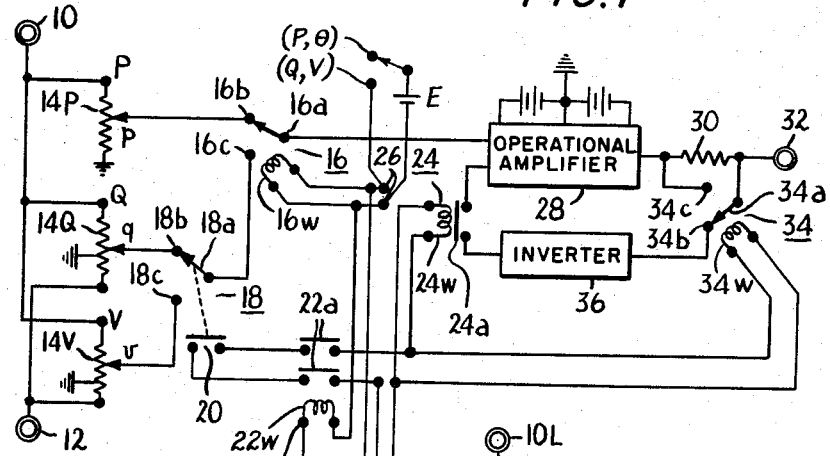
FIG. 2 is a circuit diagram of a simulated generator unit constructed in accordance with the principles of the invention.

Referring now to FIG. 2, there is illustrated a simulated generator unit constructed in accordance with the principles of the invention. The arrangement illustrated comprises a source of direct current power represented by a pair of negative and positive terminals 10 and 12 respectively, and three potentiometers 14P, Q and V, each having one end connected to the terminal 10. The potentiometer 14P has its other end connected to ground and has a slidable $p$ serving to set an active power level P; the potentiometer 14Q has its other end connected to the terminal 12 and has a slidable tap $q$ serving to set a reactive power level Q; and the potentiometer 14V has its other end connected to the terminal 12 and has a slidable tap $v$ serving to set a voltage level v. Both the potentiometers 14Q and V also have fixed taps at their respective central point connected to ground.

As shown in FIG. 2, a transfer relay generally designated by the reference numeral 16 includes an operating winding 16$w$, a movable contact 16$a$ and a pair of stationary contacts 16$b$ and $c$, with the stationary contact 16$b$ connected to the slidable tap $p$ on the active-power potentiometer 14P, and with the movable contact 16$a$ normally in engagement with the stationary contact 16$b$. The transfer relay 16 is operative to change the setting and computing of the parameter P to the setting and computing of the parameters Q and V and vice versa. The stationary contact 16$c$ is connected to a movable contact 18$a$ of a transfer switch generally designated by the reference numeral 18 and including a pair of stationary contacts 18$b$ and $c$ connected to the slidable taps $q$ and $v$ on the potentiometers 14Q and V respectively. The movable contact 18$a$ is normally in engagement with the stationary contact 18$b$.

The transfer switch 18 interlocks with a switch 20 adapted to be open when the switch contact 18$a$ is in engagement with the contact 18$b$, and to be closed when the movable contact 18$a$ is put in engagement with the contact 18$c$. The switch 18 is connected through a protective relay 22 to a control relay 24 for the purpose as will be apparent hereinafter. That is, the switch 20 includes contacts connected through two sets of normally open contacts 22$a$ of the protective relay 22 across an operating winding 24$w$ of the control relay 24 including a set of normally closed contacts 24$a$, and also across a source of direct current $E_R$. The relay 22 includes an operating winding 22$w$ connected across a pair of control terminals 26 as does the operating relay winding 16$w$. The terminals 26 serve to apply a control signal to both the operating winding 16$w$ and 22$w$ upon setting and computing the parameters Q and V.

An operational amplifier 28 has one input connected to the movable relay contact 16$a$ and the other input connected to the set of normally closed contacts 24$a$ of the control relay 24 to serve as an adder. Then the output of the operational amplifier 28 is connected through resistor 30 to a terminal 32 providing an output terminal of the simulated generator unit.

The source $E_R$ is adapted to energize a second transfer relay generally designated by the reference numeral 34. The transfer relay 34 includes a movable contact 34a connected to the junction of the resistor 30 and the output terminal 32, and a pair of stationary contacts 34b and c. The movable contact 34a is normally in engagement with the stationary contact 34b which is, in turn, connected to an inverter 36 connected to the set of control contacts 24a, while the contact 34c is connected to the junction of the operational amplifier 28 and the resistor 30.

In the arrangement illustrated it is noted that during the setting of P of the generators and loads, and during the computing of the parameters P of line flow and $\theta$, the relays 16 and 22 have no control signal applied thereto through the control terminals 26, so that they are in a deenergized state; and, due to the interlocking of the switch 18 with the switch 20, the relays 34 and 24 are in their deenergized state except when the movable switch contact 18a is put in engagement with the stationary contact 18c to set a voltage. As a result, when the relay 16 and the switch 18 are in their positions as illustrated in FIG. 2, wherein the contacts 16a and 18a are in engagement with the contacts 16b and 18b respectively, a constant current circuit is formed of a closed loop consisting of the operational amplifier 28, the resistor 30, the contact 34a engaging the contact 34b of the transfer relay 34, the inverter 36 and the normally closed control contacts 24a as will be apparent hereinafter. The engagement of the transfer contact 16a with the contact 16b causes the arrangement of FIG. 2 to be ready for setting an active power or for computing the parameters P and $\theta$, while the engagement of the transfer contact 18a with the contact 18b causes the arrangement to be ready for setting or computing the parameters Q and V.

The purpose of the protective relay 22 is to prevent the constant current circuit as above described from being broken upon setting an active power due to the energization of the relays 34 and 24. Such energization of the relays 34 and 24 may occur through the engagement of the transfer contact 18a with the contact 18c, and therefore the closing of the switch 20 when the transfer contact 16a is in engagement with the contact 16b, to set an active power.

The arrangement as above described is operated as follows: It is assumed that an active power P is to be set. With the components maintained in their positions illustrated, the slidable tap p on the P potentiometer 14P is adjusted to provide a voltage of $-V_1$, thereat corresponding to the particular active power P. The voltage of $-V_1$ is then applied through the contact 16b and a of the transfer switch 16 to the operational amplifier 28. Under these circumstances it is assumed that the operational amplifier 28 provides an output voltage of $V_2$ which, in turn, appears at the output terminal 32 as a voltage $V_3$ with an output current of I flowinG through the resistor 30 and the output terminal 32 into a resistance network as will be described hereinafter in conjunction with FIG. 4 or 5.

Under the assumed condition, the voltage of $V_3$ is applied through the transfer relay contact 34a and b, the inverter 36, and the closed control contacts 24a to the other input to the operational amplifier 28 serving also as an inverter. Thus the voltage $V_2$ from the operational amplifier 28 is expressed by the equation $$V_2 = V_1 + V_3. \quad (10)$$

Assuming that the resistor 30 has a magnitude of resistance of $R_o$, the current I flowing through the resistor 30 is expressed by the equation $$I = (V_2 - V_3)/R_o. \quad (11)$$

Substituting the equation (10) into the equation (11), gives the equation $$I = \frac{(V_1 + V_3) - V_3}{R_o} = \frac{V_1}{R_o}. \quad (12)$$

From the equation (12) it is seen that with the resistance $R_o$ remaining unchanged, the simulated generator unit provides the output current I determined only by the setting of the P potentiometer 14P. That is, the output current I is determined in accordance with the voltage $V_1$ set on the P potentiometer 14P and is independent of the voltage $V_3$ at the output terminal 32. Therefore the constant current characteristic has been provided.

From the foregoing description it will be appreciated that if the P potentiometer 14 has its slidable tap p set to provide a voltage of $V_1$ corresponding to the particular active power P, the simulated generator unit of FIG. 2 can produce a simulated active power having the prescribed magnitude of P.

If it is desired to set a reactive power Q, the relays 16 and 22 can be energized through the control terminal 26 to engage the transfer contact 16a with the associated contacts 16c. The energization of the relay 22 causes its contacts 22a to be closed which does not directly affect the network because the transfer contact 18a remains in engagement with the contact 18b. Then the slidable tap q on the potentiometer 14Q is similarly adjusted to provide a voltage corresponding to the particular reactive power Q. Thereafter the process as above described in terms of the active power will be repeated to permit the generation of simulated reactive power having the prescribed magnitude of Q. It will be appreciated that the operational amplifier 28 also provides a source of constant current.

If it is desired to provide a particular voltage of V by the arrangement of FIG. 2, then the switch 18 is manually operated such that the transfer contact is moved from the contact 18b to the contact 18c which is accompanied by the closure of the normally open contacts of the switch 20. Also, a control signal is applied to energize the transfer relays 16 and 22 through the control terminal 26. Therefore, the transfer contact 16a engages the contact 18c and the protective contacts 22a are closed to permit the relays 34 and 24 to be energized. When energized, the relay 24 opens the contacts 24a to disconnect the inverter 36 from the operational amplifier 28. Also the relay 34 moves the transfer contact 34a from the contact 34b to the contact 34c to shortcircuit the resistor 30.

Under these circumstances, the particular voltage of V set by the potentiometer 14V is applied through the contacts 18c and a, and the contacts 16c and a to the operational amplifier 28. Since the operational amplifier 28 has no input applied from the inverter 36 and since the resistor 30 is shortcircuited, an output voltage is provided identical to the set voltage of V. If the operational amplifier 28 has a low output impedance, the same can be operated as a source of constant voltage for providing a simulated voltage having the prescribed magnitude of V.

Since an active power P from any generator is necessarily positive, the P potentiometer 14P is arranged for application of a negative voltage, and the reactive power Q may lead or lag in phase with respect to the associated voltage so that the Q potentiometer 14Q includes the intermediate point connected to ground to permit a voltage set thereby to become either positive or negative. Similarly the potentiometer 14V includes the intermediate point connected to ground to set a deviation of a voltage from a reference voltage but not its absolute magnitude thereon. Thus the potentiometer 14V can provide either of simulated positive and negative voltages as the case may be.

Figure 3:
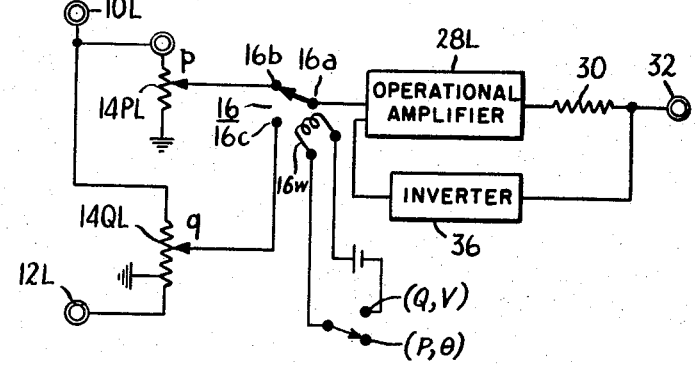
FIG. 3 is a circuit diagram of a simulated load unit constructed in accordance with the principles of the invention.

Referring now to FIG. 3, there is illustrated a load network simulating the actual load in accordance with the principles of the invention. The arrangement illustrated includes only the P potentiometer 14P for setting a simulated resistance portion of the actual load, the Q potentiometer 14P for setting a simulated reactance portion thereof, the transfer 18, the operational amplifier 28, the resistor 30, the inverter 36 and the terminals 10, 12 and 32 connected in the similar manner as above described in conjunction with FIG. 2. Therefore the components are designated by the same reference numerals denoting the corresponding components of FIG. 2 with the suffix "L". For example, the P potentiometer is designated that 14PL and the operational amplifier is designated at 28L.

Since any load consumes an active power, the same can be considered to provide a negative output. For this reason the P potentiometer 14PL is arranged to be applied with a positive voltage. On the other hand the Q potentiometer 14QL for setting a simulated reactance portion of a load may have applied thereto a positive or a negative voltage for the same reasons as above described in conjunction with FIG. 2. In other respects, the arrangement is identical to that shown in FIG. 2.

Figure 4:
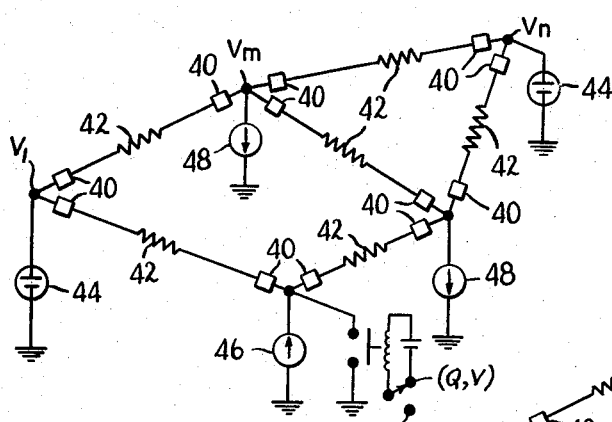
FIG. 4 is a circuit diagram of a simulated resistance network used in effecting the computation of the reactive power and voltage in accordance with the principles of the invention.
Figure 5:
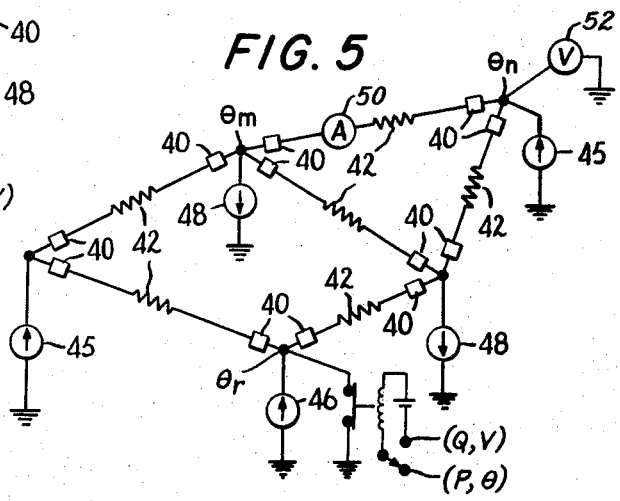
FIG. 5 is a circuit diagram of a simulated resistance network used in effecting the computation of the active power and relative phase angle of voltage in accordance with the principles of the invention.

Referring now to FIGS. 4 and 5, there are illustrated two specific resistance networks which form the basis for a computation of power flow. FIG. 4 illustrates the case wherein a reactive power Q and a voltage V are computed, while FIG. 5 illustrates the case wherein an active power and a phase angle $\theta$ of a voltage are computed. In both the Figures like references numerals designate the corresponding or identical components. In FIG. 4, each of the branch lines comprises a pair of circuit breakers 40 and a resistor 42 whose resistance is substantially equal in magnitude to the line reactance of the corresponding branch line of the electric power system to be simulated. Furthermore, at least one node has connected thereto a simulated power generator unit 44 or 46 such as shown in FIG. 2 or a simulated load unit 48 such as shown in FIG. 3, and one node chosen as a reference point is connected to ground. For example, the node labelled $V_m$ has three branch lines and the load unit 48 connected thereto while the nodes labelled $V_n$ and $V_1$ have two branch lines and constant voltage generator units 44 connected thereto with the circuit breakers 40, resistors 42 and breakers 40 connected in series circuit relationship in the named order between the nodes $V_m$ and $V_n$ or $V_1$. Thus, in FIG. 4, the generator units 44 are to prescribe the particular voltage V, and the generator unit 46 and load unit 48 to prescribe the particular reactive power Q.

The resistance network of FIG. 5 is identical in configuration to that shown in FIG. 4 excepting that the generator units 44 and shown in FIG. 4 are replaced by constant current sources 45 for prescribing the particular active power P, and that a selected one of the nodes is connected to ground. For example, the node labelled $\theta_r$ is connected to ground to provide a reference point with respect to which a phase angle of each branch line is determined.

In the arrangement shown in either of FIGS. 4 and 5, the generator and load units are preset to provide a prescribed positive or negative output, and the circuit breakers are suitably closed or opened to simulate the particular electric power system to be computed. Then a suitable voltage is applied to the resistance network to cause currents to flow therethrough. The voltages and currents for the respective branch lines are determined in accordance with Ohm's and Kirchhoff's laws. Under these circumstances the currents flowing through the respective branch lines and the voltages at the nodes can be measured by suitable meters connected to all of the branch lines and nodes. That is, each branch line has an ammeter 50 connected serially therein, and voltmeters 52 connected between the respective nodes and ground. For example, one each of said ammeters and voltmeters are shown in FIG. 5. The measured values of the currents and voltages are multiplied by respective rates of conversion by the measuring devices, predetermined on the basis of the correspondence of parameters between the actual electric power system and the simulated resistance network as previously described to complete the computation of the requisite power flow. That is, the requisite reactive power Q and voltage V are determined by the resistance network of FIG. 4 while the requisite active power and phase angle are determined by the arrangement of FIG. 5. The computation of P and $\theta$ in FIG. 5, and the computation of Q and $\Delta V$ in FIGS. 4 are permitted by changing the energization state of transfer relay 16 in FIGS. 2 and 3.

It will be appreciated that the result of the computation and known line resistances of the power system may be used in equations (5) and (6) in order to increase the accuracy of computation.

What we claim is:

1. A simulated power system for use in computing power flow in an actual power system, said simulated power system comprising resistance network means including a plurality of resistors connected respectively between a plurality of pairs of terminals which define a plurality of nodes of said network, said network means corresponding to a transmission system of said actual power system, simulated power means for supplying power to said network means and including a separate simulated power source for each power source of the actual system, each of said simulated power source being coupled to a respective node to apply a voltage to said node, simulated load means for simulating loading characteristics of said actual system and including a separate constant current generator means for each load of the actual system, each said constant current generator means being coupled to a respective node for drawing current therefrom, current meter means connected to said network means for measuring current levels through each one of said resistors and voltage meter means for measuring levels at each of said nodes, said simulated power source and load means to simulate the actual system in accordance with the equations $$Pmn = \frac{\theta m - \theta n}{Xmn},$$

$$Qmn = \frac{\Delta Vm - \Delta Vn}{Xmn},$$

and $$i_{mn} = \frac{v_m - v_n}{r_{mn}},$$

where

Pmn is the active power through one said resistor connected between selected nodes $m$ and $n$, Qmn is the reactive power through said one resistor, $\theta m$, $\theta n$ are the phase angles at the selected nodes $m$ and $n$, $\Delta Vm$, $\Delta Vn$ are the differences between actual voltages and standard voltages at the selected nodes $m$ and $n$, $i_{mn}$ is the current through the branch between the selected nodes $m$ and $n$ as measured by said meter means, $r_{mn}$ is the resistance value of said one resistor, and $v_m$ and $v_n$ are the voltages at the selected nodes $m$ and $n$ as measured by said meter means, wherein active power Pmn corresponds to said current $i_{mn}$, and phase angles $\theta m$ and $\theta n$ correspond to voltages $v_m$ and $v_n$ in the case of computing active power and phase angle; and wherein reactive power Qmn corresponds to current $i_{mn}$, and difference voltages $\Delta Vm$ and $\Delta Vn$ correspond to voltage $v_m$ and $v_n$ in the case of computing reactive power and difference voltage.

2. A simulated power system as set forth in claim 1, in which said simulated power source includes a DC potential source, a potentiometer having an adjustable tap, and having end leads connected across said potential source, an operational amplifier having first and second inputs and having an output, said first input being connected to said tap, a feedback resistor having a first terminal connected to said operational amplifier output and a second terminal coupled to a respective one of said respective power source nodes, and an inverter circuit coupled between said second terminal of said feedback resistor and said second input of said operational amplifier, whereby a constant current source is provided at said second terminal of said feedback resistor, said constant current being variable with a variation of position of said tap.

3. A simulated power system as set forth in claim 2, further comprising switching means connected to said feedback resistor and said inverter circuit, and means for operating said switching means to an actuated position to disconnect said inverter circuit from its said circuit connection with said operational amplifier, and to provide a short circuit across said feedback resistor, whereby a constant voltage is provided at said second terminal of said feedback resistor upon operation of said switch means to said actuated position.

4. A simulated power system as set forth in claim 2, in which said potentiometer has a grounded center-tap, wherein said adjustable tap is positionable to apply selectively a negative or positive voltage to said first input of said operational amplifier, whereby said second terminal of said feedback resistor provides selectively a constant current source or a constant current drain for use respectively as a said simulated power source or a said simulated load.

* * * * *